July 29, 1924.
L. N. VINCENT
FLANGE LUBRICATOR
Filed Dec. 13, 1922
1,503,174
2 Sheets-Sheet 1
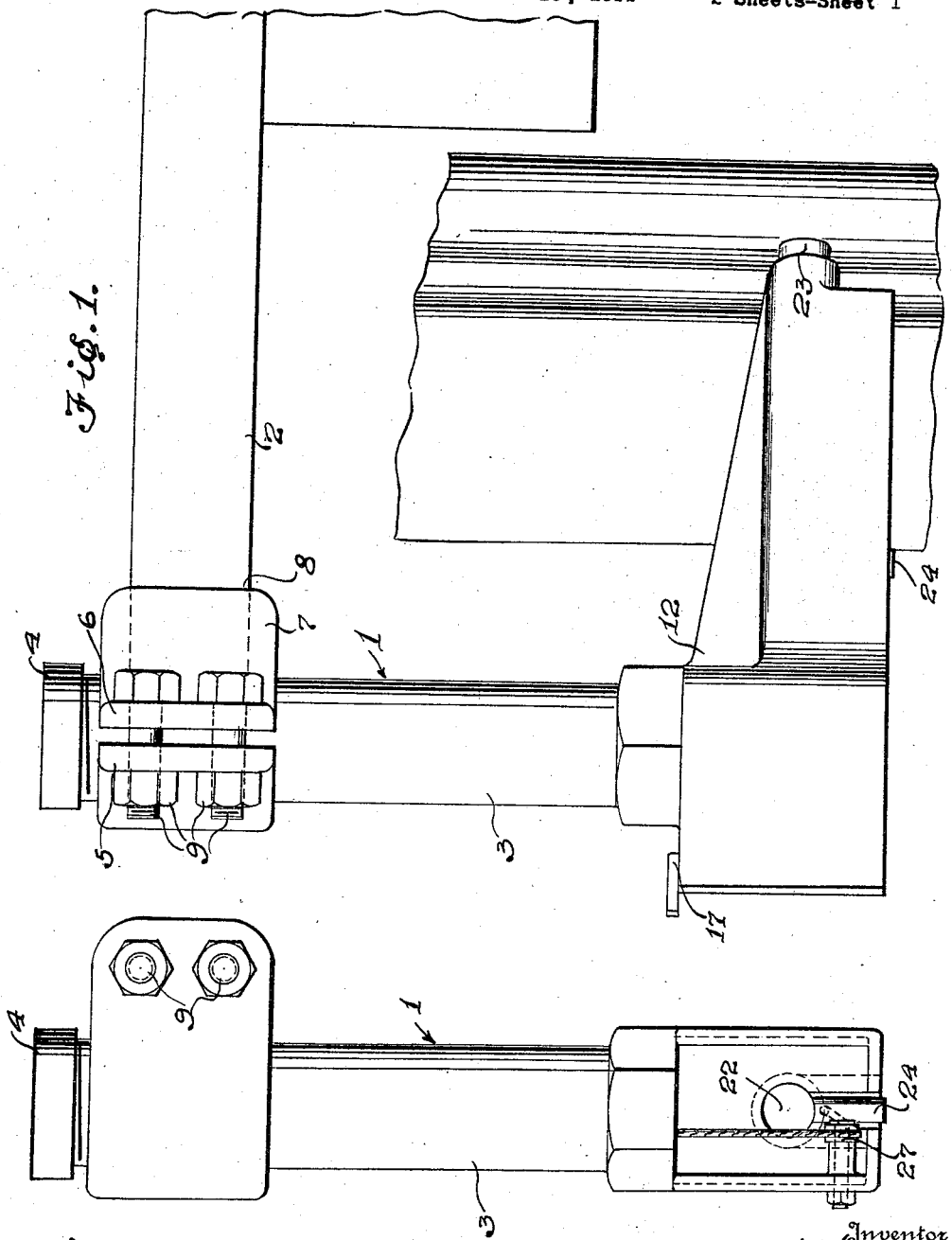
Inventor
Louis N. Vincent
By Blackwood Bros.
Attorneys.

July 29, 1924.

L. N. VINCENT

FLANGE LUBRICATOR

Filed Dec. 13, 1922     2 Sheets-Sheet 2

1,503,174

Inventor
Louis N. Vincent,
By Blackwood Bros.,
Attorneys.

Patented July 29, 1924.

1,503,174

UNITED STATES PATENT OFFICE.

LOUIS N. VINCENT, OF SEATTLE, WASHINGTON, ASSIGNOR TO IMPERIAL STEAM APPLIANCE COMPANY, OF SEATTLE, WASHINGTON, A CORPORATION.

FLANGE LUBRICATOR.

Application filed December 13, 1922. Serial No. 606,719.

*To all whom it may concern:*

Be it known that I, LOUIS N. VINCENT, a citizen of the United States, residing at Seattle, in the county of King, State of Washington, have invented certain new and useful Improvements in Flange Lubricators; and I do declare the following to be a full, clear, and exact description of the invention, such as will enable others skilled in the art to which it pertains to make and use same.

My invention relates to improvements in flange lubricators for wheels, and more particularly to lubricators for use in lubricating the flanges of the wheels of locomotives, steam, electric and other cars, etc.

The invention consists in the several features, and in the construction, combination and arrangement of such features as more fully hereinafter described and claimed.

The object of the invention is to thoroughly and constantly lubricate the flanges of the wheels of a locomotive or car, especially when the wheels are travelling on the curved portions of a track, as very little if any lubrication of the flanges is necessary when the wheels are travelling on a straight track.

A further object is to provide a flange lubricator for wheels which will cause the lubricant to be automatically fed to the flanges of the wheels by means of the lateral or sidewise movement or play of the truck or engine frame and also the lateral movement of the wheels between the rails during their travel on the track.

A further object is to provide a flange lubricator for wheels which will operate continuously and automatically and require no attention or care except the keeping of the lubricant receptacle constantly supplied with lubricant sticks.

A further object is to provide a flange lubricator for wheels having a stick of lubricant with means for keeping the stick of lubricant constantly and evenly pressed against the flange of the wheel, irrespective of climatic conditions which obtain in various parts of the country as it feeds the grease just as readily and smoothly in cold weather as when the weather is hot, because the solid stick of grease has no tendency to spread when fed to the flange of the wheel by the weighted means.

A further object is to provide a lubricator which when the stick of lubricant becomes used up or worn out by constant use it will cause the lubricator to stop functioning and automatically stop the feeding of the stick of lubricant and as the lubricant stick holder is positioned in such manner that it never comes in contact with the wheel there is no wear on the holder by the wheel.

A further object is to provide a lubricator which entirely eliminates the possibility of the lubricant being spread onto the tread of the wheel, and in the stick form is much easier to renew or load and being mounted in such a manner that when the flange of the wheel comes in contact with the stick of lubricant it does not cause an excessive amount of lubricant to be spread on the flange of the wheel or cause the stick to be broken or destroyed for the reason that the stick is resiliently mounted and the slightest contact of the flange of the wheel against the outer end of the stick causes it to be forced back and the weighted means causes the stick to be forced forward again.

A still further object is to provide a flange lubricator for wheels which is simple, inexpensive and durable in construction, occupies a minimum amount of space, requires no adjustment of parts, the parts are not liable to get out of order and which is easy and effective in operation.

A final object is to provide a flange lubricator which is capable of being applied to any locomotive or car without making any changes therein.

The invention consists in the several features and in the construction, combination and arrangement of such features as more fully hereinafter described and claimed.

Referring to the drawings:—

Fig. 1, is a side view,

Fig. 3, is an end view in elevation, and

Figure 4:
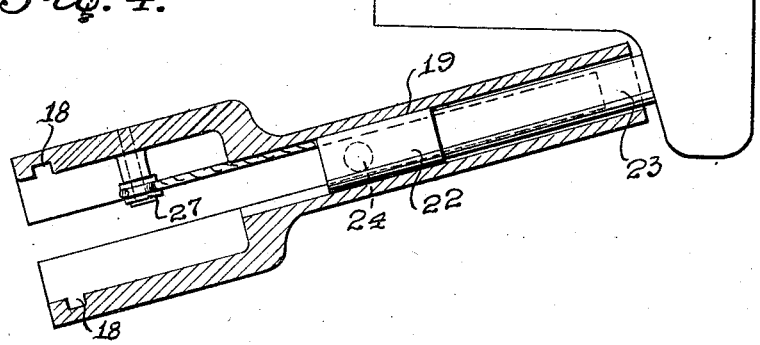
Fig. 4, is a horizontal section of the lubricant stick holder.
Figure 2:
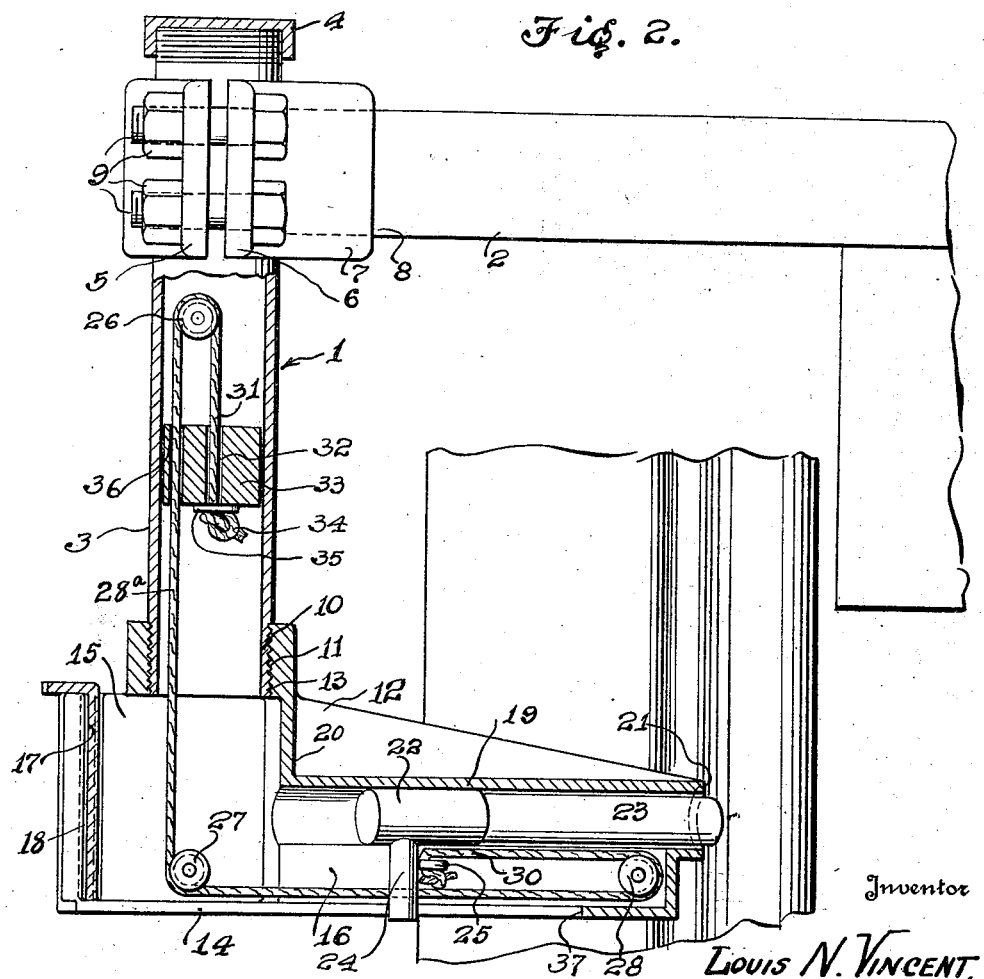
Fig. 2, is a central vertical section, partly in elevation.

In the drawings, in which similar reference characters denote similar parts throughout the several views, 1 represents the lubricator for wheels which is adapted to be mounted on or attached to a cross beam or tube 2 which in turn is mounted, in any desired manner, on the frame of the locomotive or car as the case may be.

The lubricator comprises a vertical tube 3, having a closure 4, at its upper end and a clamp having two parts 5 and 6 adjustable to any desired point on the vertical tube 3, the part 6 being provided with a screwthreaded socket 7, in which the screwthreaded end 8, of the cross beam or tube 2 is mounted, 9 being bolts and nuts by which the two parts 5 and 6 of the clamp are secured in place on the vertical tube 3.

The lower end 10 of the vertical tube 3, is provided with screwthreads 11, and 12 is a casing having screwthreads 13, which engage the screwthreads 11 on the lower end of the vertical tube 3, and by means of which the casing 12 is secured to the vertical tube 3.

The casing 12 is provided with an elongated slot 14, a vertically disposed chamber 15, a horizontally disposed chamber 16, in direct communication with the chamber 15, and at the rear of the chamber 15 a vertically slidable door 17 is mounted in guides or ways 18.

A lubricant stick tube or holder 19 is formed integral with the vertical wall 20 of the lubricator, and projects laterally and terminates in an end 21, and within the holder 19 a cylindrical lubricant carrier 22 is reciprocably mounted, in which the lubricant stick 23 is secured, and such carrier is provided with a depending lug 24 which projects through and slightly beyond the elongated slot 14 and is provided with a laterally projecting eye 25.

A plurality of sheaves 26, 27 and 28 are mounted, respectively, in the vertical tube 3, vertical chamber 15 and horizontal chamber 16 and a cable or rope 28ª, made of any desired material, is provided which runs or travels over the plurality of sheaves, the lower end 30 of the rope being secured to the eye 25 of the depending lug 24, while the upper end of the rope 31 is passed through a vertical hole 32 in the weight 33 and having a knot 34 formed on its extreme end with a washer 35 interposed between the knot and weight in order to prevent undue wear on the rope, and the weight also being provided with a hole 36 through which the rope loosely passes.

It will be noticed that the sheave 27 is mounted a sufficient distance beyond the side of the slot 14 in order to prevent it, and the rope 29 running over the same, from interfering with the insertion of the lubricant sticks into the carrier.

For the purpose of preventing the eye 25 from contacting and interfering with the operation of the sheave 28 the lug 24 is adapted to abut against the inner end 37 of the slot 14.

In operation the weight 33 keeps the lubricant stick normally beyond the end of the holder 19 and constantly pressed against the flange of the wheel, and the lateral movement of the flange of the wheel causes the lubricant stick to be pushed inward, against the pressure caused by the weight. When the stick of lubricant becomes worn away to a point approximately even with the inner end of the holder, beyond the line of contact of the wheel, the lubricator will stop functioning until a new lubricant stick is inserted.

I do not wish to be understood as limiting myself to the specific details of construction and arrangement as herein described, and illustrated in the drawings, as it is manifest that variations and modifications may be made in the features of construction and arrangement, in the adaptation of the device to the various conditions of use, without departing from the spirit and scope of my invention and the terms of the following claims:—

What I claim is:—

1. In a flange lubricator for wheels, a horizontally slidable lubricant carrier, a vertically slidable weight and means operatively connecting said horizontally slidable lubricant carrier with said vertically slidable weight whereby they are caused to move simultaneously.

2. In a flange lubricator for wheels, a casing provided with a chamber, a tube, and a second chamber between said first mentioned chamber and tube, a lubricant stick carrier slidably mounted in the mentioned chamber and provided with a lug and a lubricant stick, a weight slidably mounted in said tube and means operatively connecting said weight with said lug whereby the said lubricant stick carrier and weight are caused to move simultaneously.

3. In a flange lubricator for wheels, a horizontal lubricant stick holder, a carrier slidably mounted in said holder and provided with a lubricant stick and a lug, a vertical tube provided with a weight, a plurality of sheaves and flexible means running over said sheaves operatively connecting the lug on the carrier with the weight.

4. In a flange lubricator for wheels, a casing having a horizontal lubricant stick holder and a vertical tube, a carrier slidably mounted in said holder and provided with a lubricant stick, a slidable weight mounted in said vertical tube, a plurality of sheaves and flexible means engaging said sheaves and operatively connecting said carrier with said weight.

5. In a flange lubricator for wheels, a casing provided with a horizontal chamber, a vertical tube and a chamber between said horizontal chamber and vertical tube, a lubricant stick carrier slidably mounted in said horizontal chamber and provided with a lug and a lubricant stick, a weight slidably mounted in said vertical tube and flexible means operatively connecting the weight with the lug on the lubricant carrier.

6. In a flange lubricator for wheels, a casing provided with a horizontal chamber having a slot, a vertical tube and a chamber between said horizontal chamber and said tube, said chamber having a door, a lubricant stick carrier slidably mounted in said horizontal chamber and provided with a lug slidable in the slot in the horizontal chamber and a lubricant stick, a weight slidably mounted in said vertical tube and means operatively connecting the said weight with said lug.

7. In a flange lubricator for wheels, a lubricant stick, a tube, a lubricant stick carrier slidable in said tube, a weight having a hole therethrough, means connected to said weight passing through said hole, and on which the weight slides operatively connecting said carrier and said weight to cause the said lubricant stick to contact with the flange of a wheel.

8. In a flange lubricator for wheels, a lubricant stick, a tube, a lubricant stick carrier slidable in said tube, a weight having a hole therethrough, flexible means one end connected to said weight and passing through said hole, and on which the weight slides and the other end connected to the said lubricant stick carrier to cause the said lubricant stick to contact with the flange of a wheel.

In testimony whereof I have affixed my signature.

LOUIS N. VINCENT.